April 6, 1954 — W. C. THORNTON — 2,674,077
TRACTOR MOUNTED BEAN CUTTER AND WINDROWER
Filed Feb. 26, 1952 — 2 Sheets-Sheet 1
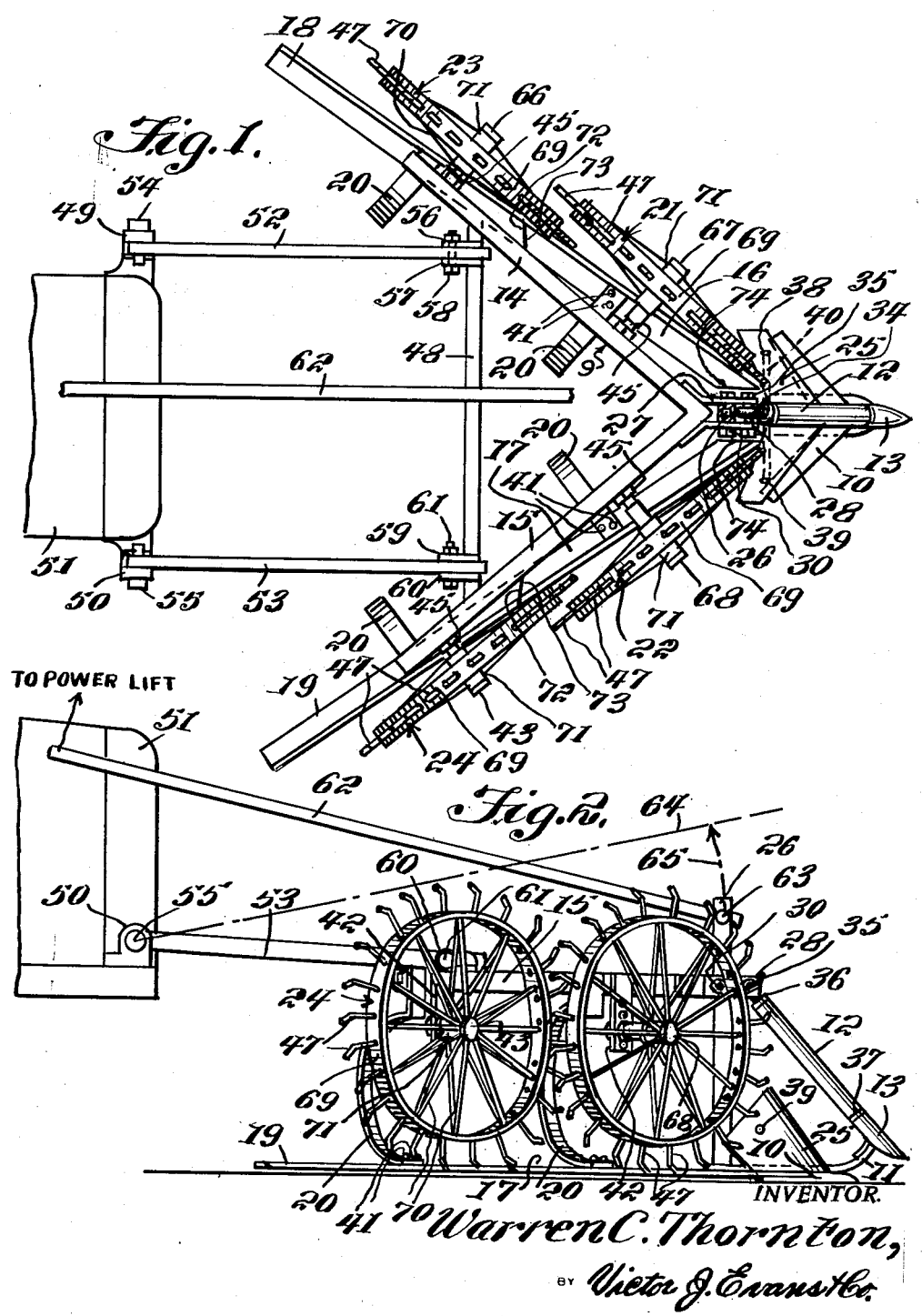
INVENTOR.
Warren C. Thornton,
BY Victor J. Evans & Co.
ATTORNEYS April 6, 1954 W. C. THORNTON 2,674,077
TRACTOR MOUNTED BEAN CUTTER AND WINDROWER
Filed Feb. 26, 1952 2 Sheets-Sheet 2
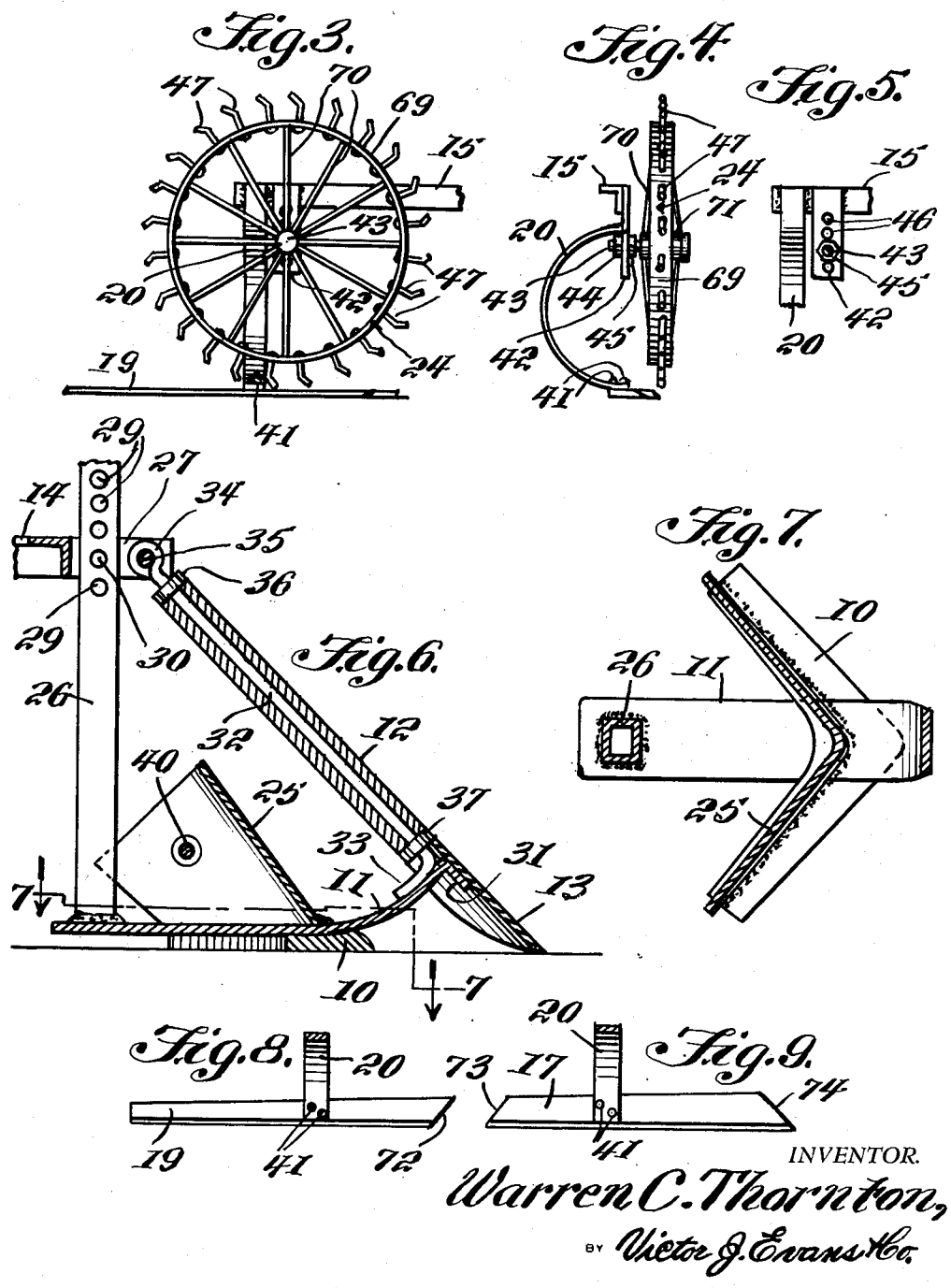
INVENTOR.
Warren C. Thornton,
BY Victor J. Evans Co.
ATTORNEYS Patented Apr. 6, 1954

2,674,077

UNITED STATES PATENT OFFICE 2,674,077

TRACTOR MOUNTED BEAN CUTTER AND WINDROWER

Warren C. Thornton, Gooding, Idaho

Application February 26, 1952, Serial No. 273,383

1 Claim. (Cl. 56—23)

This invention relates to harvesting machinery, and in particular a machine for cutting beans and which, in the same operation deposits the beans in windrows at the sides of the machine.

The purpose of this invention is to facilitate cutting and harvesting beans, and at the same time place the beans in windrows and which may also be used to follow the rows or to cut across the rows.

Various types of machines have been provided for cutting beans and similar products, however, because of the network of vines it is difficult to cut beans efficiently in a single operation. With this thought in mind this invention contemplates a harvesting machine having cutting knives positioned in a V with the knives adapted to cut on the ground or slightly below the ground and in which wheels with prongs extended therefrom coact with the knives providing means for pulling the vines or plants when the cutting action fails.

The object of this invention is, therefore, to provide an improved bean harvesting machine wherein a plurality of rows of beans, such as four or six rows may be cut and placed in windrows in one operation and wherein all beans in the rows are cut or pulled.

Another object of the invention is to provide means for forming a bean harvesting machine so that the machine will operate across rows of beans and also longitudinally of the rows.

A further object of the invention is to provide a bean harvesting machine which efficiently cuts or pulls beans and places the vines in windows in which the machine is of a simple and economical construction.

With these and other objects and advantages in view the invention embodies a horizontally disposed frame adapted to be adjustably mounted on a tractor or the like with cutting blades adapted to be mounted in the form of a V to travel over the ground or cut through the ground, a dividing blade and roller positioned at the vertex of the V and a plurality of wheels with prongs extended therefrom journaled in the frame and positioned to coact with the blades to facilitate cutting vines or plants of beans and the like.

Other features and advantages of the invention will appear from the following description taken in connection with the drawings wherein:

Figure 1 is a plan view of the improved bean cutting and windrowing attachment of this invention.

Figure 2 is a side elevational view illustrating the attachment with means for attaching the device to a tractor or the like.

Figure 3 is a detail illustrating one of the wheels with prongs extended from the periphery whereby plants or vines are drawn against cutting blades.

Figure 4 is an end elevational view of the wheels shown in Fig. 3 with the knife support positioned at one side of the wheel and with the knife carried by the lower end of said support.

Figure 5 is a fragmentary detail illustrating the mounting of the knife support and wheel bracket on the side bar of the frame.

Figure 6 is a view showing a vertical section through the center of the improved bean harvesting attachment with the parts shown on an enlarged scale and with parts omitted.

Figure 7 is a cross section taken on line 7—7 of Fig. 6 showing a shoe in the lower part of the forward end of the attachment for adjusting the elevation of the cutting blades in relation to the ground.

Figure 8 is a detail with parts in section showing a plan view of one of the cutting blades.

Figure 9 is a similar view also showing one of the blades.

Referring now to the drawings wherein like reference characters denote corresponding parts the improved harvesting machine of this invention includes a V-shaped cutting blade 10 generally referred to as a duck foot, a shoe 11 to which the blade 10 is attached and which regulates the elevation of the cutting blade in relation to the ground, a dividing roller 12 with a pointed member 13 extended from the lower end, a horizontally disposed frame 9 including side bars 14 and 15, leading cutter blades 16 and 17 extended rearwardly from the blade 10, trailing cutter blades 18 and 19, supports 20 with which the cutter blades are mounted on the frame, wheels 21 and 22 journaled on the frame and positioned to coact with the cutter blades 16 and 17, wheels 23 and 24 also journaled on the frame and positioned to coact with the cutter blades 18 and 19, and a shield 25 extended upwardly from the V-shaped blade 10 and positioned below the dividing roller 12.

The blade 10 is secured, preferably by welding to the under surface of the shoe 11 and the trailing end of the shoe is adjustably connected to the frame with a post 26 which is positioned between bars or fingers 27 and 28 extended forwardly from the vertex of the frame and, as shown in Fig. 6, the upper end of the post is provided with a plurality of spaced bolt holes 29 through which a bolt 30 is positioned. The forward end of the shoe 11 is secured to the inner surface of the point 13 wherein a flange 31 on the end of the shoe is secured, preferably by welding to the inner surface of the point.

A rod 32 connects the forward end of the shoe 11 to the frame through the bars 27 and 28 wherein an end 33 of the bar is secured to the shoe 11, preferably by welding and an eye 34 on the upper end of the bar is mounted between the bars 27 and 28 with a pin 35. The roller 12 is journaled on the bar or rod 32 and, also as shown in Fig. 6, the roller is positioned with collars 36 and 37 which are positioned on the upper and lower ends of the rod. The shield 25 is also positioned on the V-shaped blade 10 and wings at the sides of the shield are provided with openings 38 and 39 through which the shield is braced by a rod 40.

The leading and trailing cutter blades are secured to the frame with supports 20, as illustrated in Fig. 4 and the blades are secured in the lower ends of the supports with rivets 41.

The wheels which coact with the cutter blades are journaled on the frame with straps 42 in which stub shafts 43 are rigidly secured with nuts 44 and 45. The straps 42 are provided with a series of spaced openings 46 to facilitate adjusting the wheels in relation to the cutter blades.

Each of the wheels is provided with spaced prongs 47, the outer ends of which are formed to provide gripping elements whereby plants or vines are gripped by the prongs and held against the cutter blades so that as the machine travels the plants or vines are positively cut. With the vines held by the prongs 47 of the wheels they are conveyed to windrows formed at the sides of the machine.

The horizontally disposed frame is provided with a transversely positioned rod 48 by which the device is secured with bearings 49 and 50 on a tractor 51 through links 52 and 53, the forward ends of which are secured to the rod 48 and the opposite ends being pivotally connected to the tractor with bolts 54 and 55 in bearings 49 and 50. The forward ends of the links are positioned between arms extended upwardly from the rod 48, the links 52 being connected to arms 56 and 57 with a bolt 58 and the link 53 connected to arms 59 and 60 with a bolt 61.

The attachment is also provided with a strut 62 which is connected to the upper end of the post 26 with a bolt 63 and with the opposite end of the strut connected to the power lift (not shown) of the tractor the elevation of the attachment may be adjusted as indicated by the dot and dash line 64 in the arc 65.

The wheels with the prongs on the peripheral surfaces are journaled on stub shafts, similar to the shaft 43, shown in Fig. 4, the wheel 23 being journaled on a stub shaft 66, similar to the shaft 43, and the wheels 21 and 22 journaled on stub shafts 67 and 68, which are longer than the shafts 66 and 43.

Each of the wheels is formed with a band 69 in which the prongs 47 are mounted and the band is supported by spokes 70 from a hub 71 by which the wheels are journaled on the stub shafts.

As illustrated in Figs. 1, 8, and 9 the trailing cutter blades 18 and 19 are provided with beveled forward ends, as indicated by the numeral 72 and the trailing ends of the leading blades 16 and 17 are formed with corresponding beveled surfaces as indicated by the numeral 73. The leading ends of the blades 16 and 17 are provided with beveled surfaces 74.

With the parts formed in this manner the harvesting attachment is mounted on the forward end of a tractor and as the attachment is driven along or across rows of beans the plants are cut with the level of the ground or slightly below the ground with the cutter blades and with the prongs of the wheels caught in the plants or vines the wheels are rotated whereby the stems of the plants are drawn across the cutting blades so that the plants are positively cut or drawn from the soil. The wheels carry the plants from the center and intermediate part of the machine and deposit the plants upon windrows at the sides of the machine. The cutter blades and also the wheels are vertically adjustable whereby the most efficient operation of the machine is obtainable.

It will be understood that modifications may be made in the design and arrangement of the parts without departing from the spirit of the invention.

What is claimed is:

In a harvesting machine, a V-shaped blade, a shoe secured to said blade, an inclined dividing roller secured to said shoe and having a pointed lower member operatively associated thereto, a horizontally disposed V-shaped frame positioned above and rearwardly of said blade and including a pair of side bars, a pair of leading cutting blades extending rearwardly from said V-shaped blade, trailing cutting blades positioned behind said leading cutting blades, the adjacent ends of said cutting blades being beveled, support members for connecting said blades to said frame, adjustable wheels journaled on said frame for coacting with said blades, a shield extending upwardly from said V-shaped blade and positioned below said dividing roller, a post having its lower end secured to said shoe and having its upper end provided with a plurality of spaced openings, fingers extending forwardly from said frame and straddling the upper end of said post, a securing element connecting said fingers to said post, a rod extending longitudinally through said roller and having its lower end secured to said shoe and its upper end secured between said fingers, each of said wheels including a plurality of spaced prongs having their outer ends arranged angularly to provide gripping elements, means for securing said frame to a tractor, and a strut connected to the upper end of said post and extending rearwardly therefrom.

References Cited in the file of this patent

UNITED STATES PATENTS

| Number | Name | Date |
| --- | --- | --- |
| 978,118 | Durant et al. | Dec. 6, 1910 |
| 987,387 | Mahoney et al. | Mar. 21, 1911 |
| 1,171,603 | Foutz | Feb. 15, 1916 |
| 1,301,829 | Foutz | Apr. 29, 1919 |
| 1,768,324 | Kerns | June 24, 1930 |
| 2,371,076 | Stevens | Mar. 6, 1945 |
| 2,603,053 | Lipe et al. | July 15, 1952 |
| 2,638,727 | Park et al. | May 19, 1953 |